June 14, 1927.

E. CROWELL 1,632,644

ANTISKID CHAIN TIGHTENING DEVICE

Filed July 29, 1926

Inventor

Emerson Crowell

By Cushman Bryant & Darby

Attorneys

Patented June 14, 1927.

1,632,644

UNITED STATES PATENT OFFICE.

EMERSON CROWELL, OF DALZELL, SOUTH DAKOTA.

ANTISKID-CHAIN-TIGHTENING DEVICE.

Application filed July 29, 1926. Serial No. 125,740.

This invention relates broadly to new and useful improvements in pushing and pulling devices and is particularly adapted for use in connection with anti-skid chains for automobile tires.

An important object of the invention resides in the provision of a tightener including a pair of relatively movable stretching members to which the ends of the tire chain are connected and having means associated therewith for releasably retaining one end of the chain engaged with the tightener acting in a manner to prevent disengagement of the end of the chain when said members are moved to stretching positions and which will permit disengagement of the chain therefrom when the stretching members are disposed in non-stretching positions.

Another important object of the invention resides in the provision of a device of the above character with stop means acting to limit the movement of one of said stretching members in one direction when the aforesaid means for releasably retaining one end of the chain in engagement with the tightener is in either its open or closed position.

Other objects and advantages of the invention will become apparent during the course of the following description wherein like numerals are employed to designate like parts throughout the several views.

In the drawings wherein for the purpose of illustration I have shown the embodiment of the invention which is at present preferred, Figure 1 is a side elevation of the tire chain tightener in stretching position.

Figure 1:
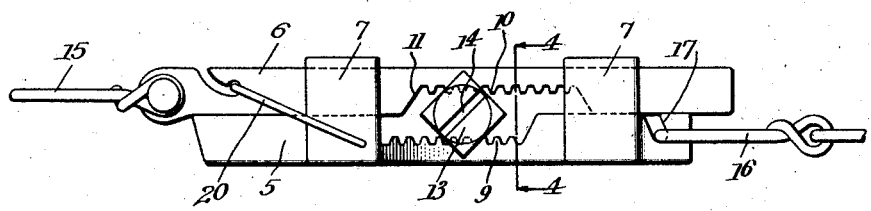

Referring now in detail to the drawing, I have illustrated the improved chain tightener in a form embodying a pair of relatively movable bars 5 and 6 which I will term stretching members. These bars are slidably engaged with each other along their inner longitudinal edges as shown, to move longitudinally inwardly of each other into stretching positions and outwardly of one another into their non-stretching positions.

In the present instance, I have shown a pair of strap-loops 7 secured to the bar 5 in a manner to permit the bar 6 to slide through the looped portions of these straps, in order that the bars will be retained in the relationship described above; but it will be noted that instead of forming the two straps upon the one bar 5, one of them may be secured to the bar 6 to permit the bar 5 to slide therethrough.

The means provided for moving the two bars relatively to each other comprises a rack and pinion arrangement in the present instance, which is desirable in such devices because it moves both bars simultaneously and facilitates the adjustment of the device to stretching and non-stretching positions. A pinion 8 is arranged between racks 9 and 10 of the bars 5 and 6 respectively to cooperate therewith in moving the bars relatively. These two racks in the stretching bars are provided in the bottoms of cutout portions 11 which are disposed substantially medially of the inner edges of the respective bars as shown. One end of the pinion has a washer 12 or other shouldered arrangement for engagement with the sides of the bars 5 and 6 to prevent axial movement of the pinion in one direction, while the other end of the pinion is provided with an enlarged polygonal head 13 which also overlaps the sides of the two bars to prevent displacement of the pinion in the opposite direction. This polygonal head also provides for rotation of the pinion with a wrench or other suitable tool, and is provided with a cross-groove 14 for the reception of a screw driver for turning the pinion and effecting relative movement of the bars through the intermediacy of the racks 9 and 10.

Figure 2:
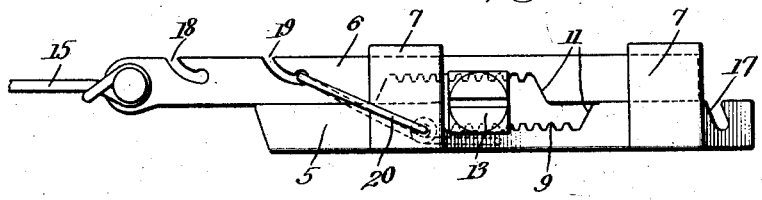
Figure 2 is a similar view of the device in non-stretching position.

The ends of the tire chain are connected to opposed ends of the stretching bars 5 and 6, it being observed that one end of the tire chain indicated by the numeral 15 is secured to the end of the bar 6 in any suitable manner, while one of the end links 16 of the other end of the chain is releasably connected to the opposed end of the bar 5. For this purpose, the inner edge of the bar 5 adjacent said end is provided with a recess or notch 17 to receive one of the end links 16 of the tire chain for releasably connecting it to the tightener. It will be observed, from Figure 1, that the recess 17 is closed or uncovered by the complementary bar 6 when the two bars are disposed in stretching positions in order to prevent accidental displacement of the end of the tire chain from the bar 5. However, when the bars are moved to non-stretching position, as shown in Figure 2, the link receiving recess 17 of bar 5 will be opened or uncovered by the complementary bar 6 to permit easy disengagement of the end of the link 16 from the tightening device.

In order to limit the outward movement of the bars 5 and 6 and to retain the link receiving recess 17 in either its open or closed position, stop means are provided which automatically come into action when the bars are disposed either in non-stretching position and the link receiving recess 17 is open, or when the bars are disposed in stretching position and the recess 17 is closed by the bar 6.

In the present illustration this stop means is formed by providing the outer longitudinal edge of the bar 6, adjacent the end thereof to which the end 15 of the tire chain is connected, with a pair of spaced notches 18 and 19 for co-operation with a latch 20 carried by the bar 5. It will be particularly noted that these notches 18 and 19 are inclined inwardly toward the center of the bar 6 and open in a direction toward the end of the bar to which the tire chain 15 is connected, in order that the latch 20 will co-operate therewith in limiting the outward movement of the stretching bars and yet not interfere with the free inward movement of these bars, since the latch 20 will ride over these notches when the bars are moved to stretching positions. It may be stated here that additional notches similar to those 18 and 19 may be provided without departing from the scope of the invention.

Figure 3:
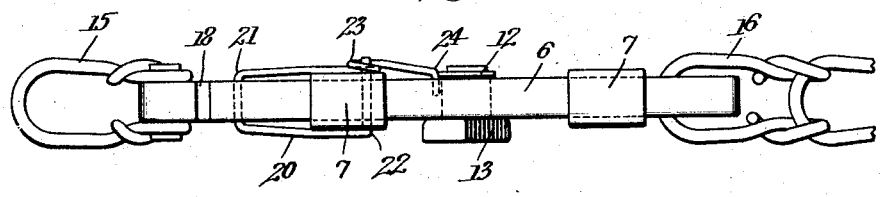
Figure 3 is a top plan of the tightener shown in the position illustrated in Figure 1.
Figure 4:
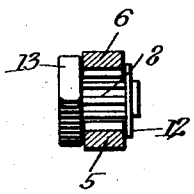
Figure 4 is a transverse section of the device taken on the line 4—4 of Figure 1.

The latch 20, in the present instance is illustrated as being spring-pressed, although it is not necessary that it be so actuated. This latch 20 is in the form of a resilient yoke, as best seen in Figure 3, adapted to straddle the bar 6 in a manner that its bight portion 21 will be received in either of the notches 18 or 19. This latch is pivoted to the bar 5 by extending an angular end 22 thereof through the bar 5 and the loop strap 7, and in order to render the latch spring-pressed, the other end of the yoke is coiled around the extended end of the portion 22 as shown at 23, and is carried inwardly along the bar and has its free end 24 suitably anchored in the side of the bar 5. By this construction the latch is normally urged downwardly upon the outer longitudinal edge of the bar 6 so that it will ride thereover during relative movement of the bars and snap into notches 18 or 19 as the bars are moved inwardly or outwardly of each other into stretching or non-stretching position, as explained herebefore.

It is believed that the use of the device is entirely clear from the foregoing description, but it may be stated for further clearness that the pinion 8 is turned when it is desired to tighten a chain about a tire so that the two bars 5 and 6 move outwardly of each other to substantially the position shown in Figure 2 so that the link receiving recess 17 is opened or exposed for the insertion thereinto of the end link 16 of the chain. It will be seen, that when the device is adjusted to this position, the spring-pressed latch 20 has dropped into latch 19 to prevent further outward movement of the bars in order to prevent their disconnection. After the end link 16 has been placed in the link receiving recess 17, the pinion 8 is turned in the opposite direction to cause the two bars to move inwardly of each other to tighten the tire chain, and as the bars move in this direction it will be seen that the bar 6 will cover or close the notch 17 and prevent accidental displacement of the end link 16. When the bars have been adjusted to properly tighten a chain about a tire, the latch 20 will have snapped into the notch 18 to retain the bars in the newly adjusted position and will effectively prevent outward movement of the bars to slacken the chain unless the spring-pressed latch is manually lifted from the notch 18.

Although I have illustrated and described the invention as being used for tightening anti-skid tire chains, it is to be understood that the device is capable of stretching wire and other things and consequently it is to be understood that the appended claims are to be construed in such a manner.

It is to be further understood that I do not restrict the invention to the precise form herein described and that various changes in the shape, size and arrangement of parts may be resorted to without departing from the scope of the appended claims.

Having thus described my invention what I claim is:

1. A strand tightener comprising in combination, a pair of relatively movable stretching members adapted to be connected respectively to the ends of a strand to tighten the same, one of said members having a recess for the reception of one end of said strand and adapted to be covered to prevent displacement of said end when said members are moved to operative stretching position and to be opened when said members are moved to inoperative non-stretching position, and means for moving said stretching members relatively.

2. A tire chain tightener comprising in combination, a pair of relatively movable stretching bars adapted to be connected respectively at opposed ends to the ends of a chain, one of said bars having a recess adjacent its end for the reception of a chain link to connect one end of the chain thereto and adapted to be closed by the other bar when said bars are moved inwardly of each other to stretching positions and to be opened when said bars are moved in the opposite direction into non-stretching position.

3. A tire chain tightener comprising in combination, a pair of relatively movable stretching bars adapted to be connected respectively at opposed ends to the ends of a chain, one of said bars having a recess adjacent its end for the reception of a chain link to connect one end of the chain thereto and adapted to be closed by the other bar when said bars are moved inwardly of each other to stretching positions and to be opened when said bars are moved in the opposite direction into non-stretching position, and means acting to limit the outward movement of the recessed bar to retain the link receiving recess either in its open or closed position.

4. A tire chain tightener comprising a pair of relatively movable stretching bars adapted to be connected respectively at opposed ends to the ends of a chain, one of said bars having a recess adjacent its end for the reception of a chain link to connect one end of the chain thereto and adapted to be closed by the other bar when said bars are moved inwardly of each other, and to be opened when said bars are moved in the opposite direction, one of said bars having a pair of notches, latch means co-operating with said notches, said pair of notches being inclined in a direction to limit the outward movement of the recessed bar and arranged with respect to said recess to retain it either in its open or closed position.

5. A tire chain tightener comprising a pair of relatively movable longitudinally slidable bars engaging each other along their inner longitudinal edges and adapted to be connected respectively at their opposed ends to the ends of a chain, one of said bars having a notch in its inner edge adjacent its end for the reception of a chain link to connect one end of the chain thereto, said notch being closed by the other bar when the latter slides thereover to prevent displacement of the chain link, and said notch being opened when said latter bar uncovers said notch to permit removal of the chain link.

6. A tire chain tightener comprising a pair of relatively movable longitudinally slidable bars engaging each other along their inner longitudinal edges and adapted to be connected respectively at their opposed ends to the ends of a chain, one of said bars having a notch in its inner edge adjacent its end for the reception of a chain link to connect one end of the chain thereto, said notch being closed by the other bar when the latter slides thereover to prevent displacement of the chain link, and said latch being opened when said latter bar uncovers the said notch to permit removal of the chain link, one of said bars having a pair of notches, the other bar having a spring-pressed latch adapted to co-operate with said pair of notches, and said pair of notches being arranged with respect to said link receiving notch to retain it either in its open or closed position.

7. A tire chain tightener comprising in combination, a pair of relatively movable stretching members adapted to be connected respectively at opposed ends to the ends of a chain, one of said members having a recess adjacent its end for the reception of a chain link to connect one end of the chain thereto, and adapted to be covered to prevent displacement of said link when said members are moved to operative stretching position and to be opened when said members are moved to inoperative non-stretching position, and means for releasably locking the recessed member in either a position with said recess open or in a position with its recess closed.

In testimony whereof I have hereunto set my hand.

EMERSON CROWELL.